M. W. NEEDHAM.
RUBBER TIRE FILLER WITH A FLEXIBLE METAL CABLE IN THE CENTER.
APPLICATION FILED OCT. 7, 1918.

1,339,472. Patented May 11, 1920.

WITNESS:—
Chas. L. Griesbauer

Inventor
Moses W. Needham,
By Jerry A. Mathews,
and Lester L. Sargent Attorneys

UNITED STATES PATENT OFFICE.

MOSES W. NEEDHAM, OF WACO, TEXAS.

RUBBER TIRE-FILLER WITH A FLEXIBLE METAL CABLE IN THE CENTER.

1,339,472.  Specification of Letters Patent.  Patented May 11, 1920.

Application filed October 7, 1918. Serial No. 257,279.

*To all whom it may concern:*

Be it known that I, MOSES W. NEEDHAM, a citizen of the United States, residing at Waco, in the county of McLennan and State of Texas, have invented a new and useful Rubber Tire-Filler with a Flexible Metal Cable in the Center, of which the following is a specification.

The object of my invention is to provide a novel and improved rubber tire filler which is reinforced by a metal cable or nonstretchable strand or strands to prevent the fillers from slipping while permitting of sufficient flexibility to allow the tire casing to be readily engaged over the filler. It is further an object of my invention to provide a device which can be manufactured at low cost, and in which strips of rubber from old inner tires may be employed in making the filler. I attain the objects of my invention by the mechanism illustrated in the accompanying drawings, in which—

Like characters of reference designate like parts throughout the several views.

Figure 1:
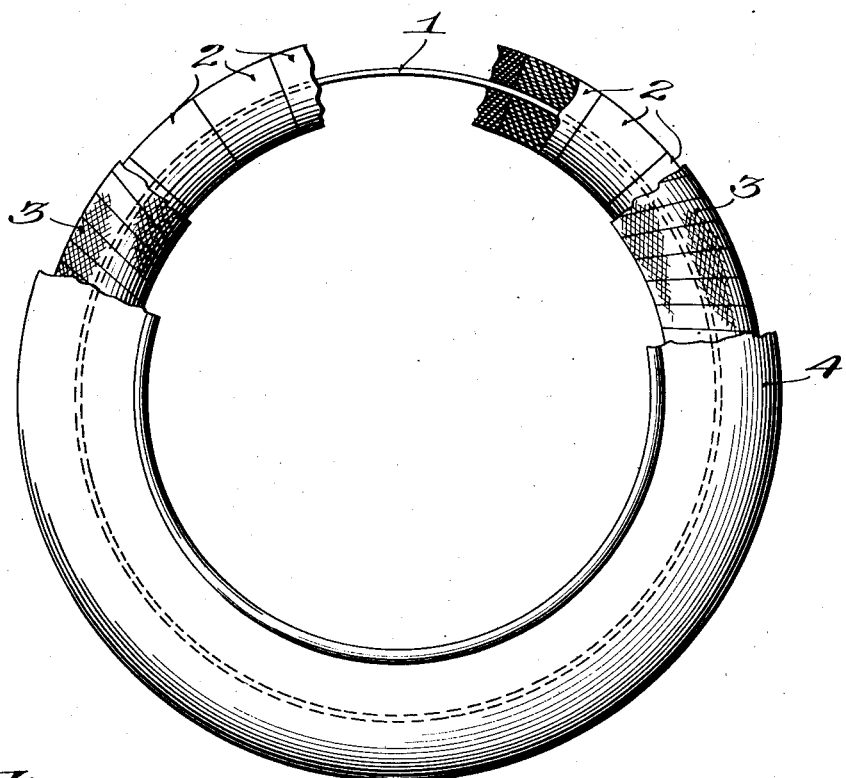
Figure 1 is a side elevation of a tire casing containing my device, parts being broken away and part shown in section to fully disclose the device.
Figure 2:
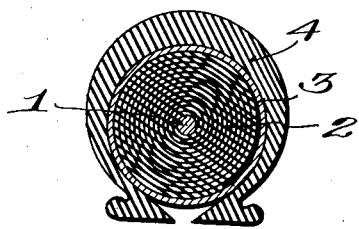
Fig. 2 is a section through a tire casing containing my invention.
Figure 3:
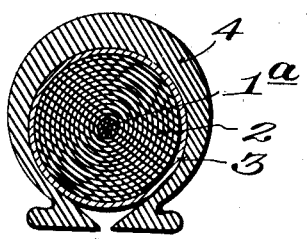
Fig. 3 is a section through a modified form having a reinforcing element composed of a plurality of strands.

Referring to the drawings, I provide a suitable nonstretchable metal reinforcing cable, or wire, forming a complete ring, forming a solid cable without break or joint, with the ends suitably welded or united together, in permanent union.

Upon said cable 1ª or wire 1, are secured a series of cylindrical rubber fillers 2, preferably consisting of sheets of rubber wound over and over to form a series of core elements with their ends in contact. By this construction I am enabled to employ the rubber of discarded inner tubes in manufacturing my filler. Over the core thus formed, I suitably wind strips 3 of canvas or similar material to hold the cores 2 in place.

It is required that the cable 1ª or wire 1 be of sufficient flexibility to permit of flexing the filler for insertion in the tire casing 4, but it is further required that said cable 1ª or wire 1 be nonstretchable. In this respect my invention is an important improvement over prior devices in this art in which a rope is employed, as it has been determined from actual use that the rope will stretch and that such fillers are inefficient. Further, the cable 1ª or wire 1 must have sufficient strength to hold the filler firmly on the rim of the wheel. The tire casing is stretched and forced over the tire filler, the filler also being flexed to facilitate this operation. The flexibility of the filler is sufficient to permit of its mounting on the automobile wheel.

The filler may be made of sheet rubber or any other kind of rubber sufficiently resilient and strong enough to hold the weight of the car and its burden; and it is required that such material be used and not cork, which has been employed in prior devices and which is inefficient by reason of its absorption of moisture and its tendency to flatten and lose resiliency.

The invention is believed to include not only the device but the new mode of manufacturing said device, consisting in forming a complete ring of nonstretchable wire or cable; mounting thereon a series of adjoining rubber fillers by wrapping strips of rubber successively over the cable to the required size; suitably securing the strips, which may be either by guling the ends or tying with cords; and wrapping the cores thus formed with a strip or strips of canvas, preferably in spiral arrangement, as above described, and inserting the device thus formed in a tire casing.

What I claim is:

1. In a reinforced rubber tire filler, the combination of a nonstretchable but flexible cable in the form of a complete ring, strips of rubber successively wound over said cable to provide resilient cores of the necessary size, said strips being secured against unwinding, and a fabric element wound spirally over said resilient cores, the completed device being of sufficient flexibility to admit of its insertion in a tire casing, for the purposes described.

2. The method of making a reinforced rubber tire filler, consisting in forming a complete ring from a non-stretchable metal reinforcing element, successively winding upon said reinforcing element separate strips of rubber to form contiguous filler elements of the required size; securing same against unraveling; and wrapping said filler elements with fabric to effect a substantially homogeneous tire filler, whereby to provide a rubber filler strong enough to hold the weight of a car and having sufficient flexibility to permit of its convenient insertion in a tire casing.

MOSES W. NEEDHAM.